(12) United States Patent
Jensen et al.

(10) Patent No.: US 6,764,295 B2
(45) Date of Patent: Jul. 20, 2004

(54) ROTARY CUTTER

(75) Inventors: Richard B. Jensen, Caldwell, ID (US); David B. Walker, Meridian, ID (US); Michael M. Gallagher, Spokane, WA (US)

(73) Assignee: J. R. Simplot Company, Boise, ID (US)

(*) Notice: Subject to any disclaimer, the term of this patent is extended or adjusted under 35 U.S.C. 154(b) by 200 days.

(21) Appl. No.: 10/192,167

(22) Filed: Jul. 8, 2002

(65) Prior Publication Data

US 2004/0013759 A1 Jan. 22, 2004

Related U.S. Application Data

(60) Provisional application No. 60/310,803, filed on Aug. 8, 2001.

(51) Int. Cl.[7] ........................ B26D 1/553; A21C 11/12
(52) U.S. Cl. ................... 425/316; 425/377; 425/392; 426/516; 426/518; 83/331; 83/651.1
(58) Field of Search ................ 425/316, 377, 425/392, DIG. 108; 426/446, 464, 473, 516, 517, 518; 83/331, 343, 651.1

(56) References Cited

U.S. PATENT DOCUMENTS

| | | | |
|---|---|---|---|
| 2,248,291 A | 7/1941 | Walbom | |
| 2,888,888 A | 6/1959 | Jorgenson et al. | |
| 3,512,990 A | 5/1970 | Slaybaugh | |
| 3,988,085 A | 10/1976 | Krchma | |
| 4,692,109 A | * 9/1987 | Hayashi et al. | 425/308 |
| 5,840,345 A | 11/1998 | Ayash | |
| 6,187,358 B1 | 2/2001 | Inoue et al. | |
| 6,197,355 B1 | 3/2001 | Zietlow et al. | |

FOREIGN PATENT DOCUMENTS

DE  2 202 968  * 9/1973

* cited by examiner

Primary Examiner—James P. Mackey
Assistant Examiner—Donald Heckenberg
(74) Attorney, Agent, or Firm—Kelly Lowry & Kelley, LLP

(57) ABSTRACT

A rotary cutter is provided for cutting elongated extruded strips of a food dough product or the like on a conveyor into individual strip pieces of selected length and having angular cut ends simulating the overall appearance of French fry strips cut from whole potatoes. The rotary cutter comprises a pair of rotary support wheels mounted on opposite sides of the conveyor for rotation on longitudinally spaced axes extending normal to the direction of conveyor travel. A plurality of cutter elements extend transversely and angularly across the conveyor with their opposite ends carried by the rotary support wheels generally at the peripheries thereof for engaging and cutting conveyed extruded strips into individual and angularly end-cut strip pieces of selected length. A drive motor rotatably drives one of the support wheels for displacing the cutter elements into engagement with the extruded strips at a velocity closely matching the conveyor velocity.

21 Claims, 2 Drawing Sheets

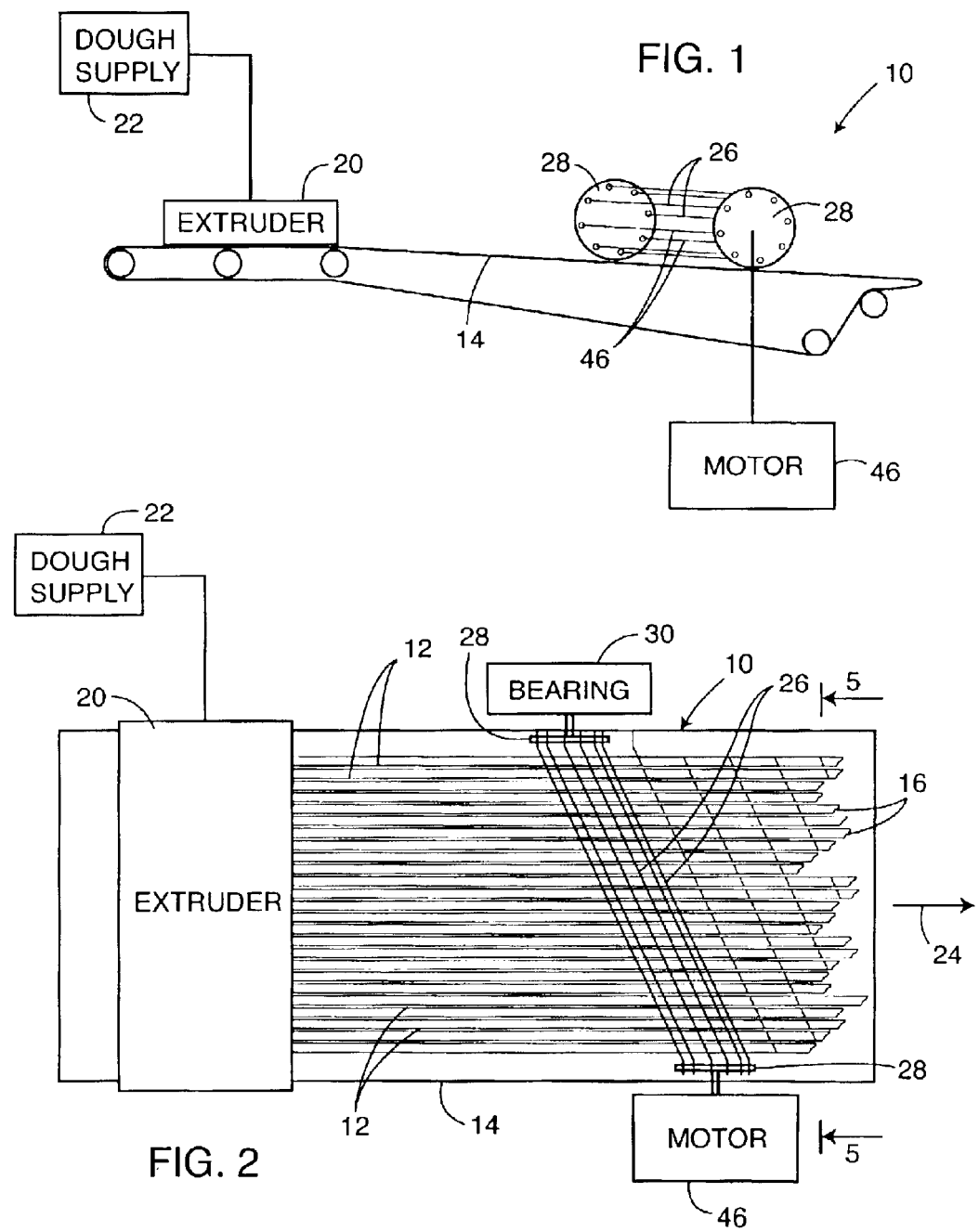

ROTARY CUTTER

This application claims the benefit of U.S. Provisional Application No. 60/310,803, filed Aug. 8, 2001.

BACKGROUND OF THE INVENTION

This invention relates generally to devices and methods for cutting elongated extruded strips of a food dough product or the like into individual strip pieces of selected length and having angular end cuts to simulate French fry potato strips cut from whole potatoes. More particularly, this invention relates to an improved yet relatively simple cutter apparatus and method for use in production processes for fast and efficient cutting of a large plurality of extruded dough strips to the desired size and shape.

French fried potato strips constitute a popular consumer food item. Such potato strips are normally prepared by cutting whole raw potatoes into individual elongated strips of selected cross sectional size and shape, and then cooking the cut strips by various processes including at least one frying step in hot oil to produce a crisp and golden-brown exterior encasing a moist and mealy interior. In one common form, French fried potato strips are partially fried, or parfried, and then frozen at a production facility for subsequent shipment to a customer such as a restaurant or the like. The parfried product can be stored in the frozen state until finish preparation is desired, as by finish frying or by optional methods such as oven heating, microwave heating, etc.

The popularity of natural-cut French fried potato strips has led to the development of alternative food products having analogous appearance, texture, and/or taste characteristics. In this regard, a variety of such alternative food products have been produced from a pliable dough mass based upon food products such as potato-based dough, corn-based dough, and others. See, for example, U.S. Pat. No. 4,293,583 which describes a potato-based dough, and WO 01/08499 A1, published Feb. 8, 2001, which describes a corn-based dough. In these products, the dough mass is formed as by extruding into elongated dough strips having a cross sectional size and shape similar to a natural-cut French fry potato strip, whereupon the dough strips are then cut into relatively short individual strip pieces each having a length to emulate a natural-cut French fry potato strip. The thus-formed and thus-cut strips can then be processed by various steps which may include frying in hot oil.

To produce dough-based strips in production quantities, it is necessary to form a large plurality of dough strips on a concurrent basis for further production processing such as cutting and parfrying prior to freezing for shipment and/or storage. In this regard, extrusion forming equipment has been developed for extruding a food-based dough into multiple elongated strips deposited in closely-spaced parallel relation onto a conveyor for transporting the extruded strips to subsequent processing stations. See, for example, U.S. Pat. Nos. 4,302,478; 4,124,339; 4,614,489; 5,536,517; 5,668,540; 5,840,346; and 5,820,911. See also copending Provisional Appln. No. 60/303,628, filed Jul. 5, 2001. These parallel extruded strips are initially conveyed to a cutting station for cutting the elongated extrusions into individual strip pieces having a length similar to French fry strips cut from whole raw potatoes. Thereafter, the cut strip pieces are transported to appropriate parfrying, freezing, and packaging equipment.

However, in the past, strip cutting equipment has generally comprised one or more cutting elements arranged for forming the strip pieces with end cuts extending generally perpendicular to the direction of conveyor travel. In other words, the strip cutting equipment has been designed to form the strip pieces with square-cut ends. This strip geometry contrasts with the natural angular end shapes found in French fry strips cut from whole potatoes, wherein this angular end shape is attributable to the curved geometry of the opposite ends of a natural whole potato. Attempts to redesign the strip cutting equipment to cut the extruded strips into individual pieces having more natural-appearing angular end cuts have applied at least some sideways or lateral force to the extruded strips, resulting in the risk of sideways or transverse shifting of the strips on the conveyor. Such lateral shifting of the closely spaced extruded strips can cause the strips to contact each other and stick together to yield undesirable multi-strip clumps. Such clumps are difficult to separate without damaging the strip appearance and integrity.

There exists, therefore, a significant need for further improvements in and to cutting devices and methods for cutting multiple extruded strips formed from a food dough or the like into individual strip pieces having a selected length and angular end cuts to simulate the overall appearance of French fry potato strips cut from whole potatoes, substantially without sideways or lateral shifting and resultant contact or sticking together of adjacent cut strip pieces. The present invention fulfills these needs and provides further related advantages.

SUMMARY OF THE INVENTION

In accordance with the invention, an improved rotary cutter is provided for cutting elongated extruded strips of a food dough product or the like on a conveyor into individual strip pieces of selected length and having angular cut ends simulating French fry strips cut from whole potatoes. The rotary cutter includes a plurality of cutter elements extending transversely and angularly across the conveyor for engaging and cutting a large plurality of the elongated extruded strips carried on the conveyor in closely spaced, substantially parallel relation. The cutter elements are supported and driven for engaging and cutting the extruded strips substantially in the absence of any sideways or transversely directed forces, whereby the individual strip pieces are formed with angular end cuts in a manner substantially eliminating lateral shifting of the cut strip pieces on the conveyor.

In a preferred form of the invention, the rotary cutter comprises a pair of rotary support wheels mounted on opposite sides of the conveyor in longitudinally spaced relation, with each support wheel mounted for rotation on an axis extending transversely or normal to the direction of conveyor travel. The plurality of cutter elements extend transversely and angularly across the conveyor with their opposite ends carried by the rotary support wheels generally at the peripheries thereof. In a preferred geometry, the cutter elements extend across the conveyor at an angle of about 65° to the longitudinal direction of conveyor travel. The cutter elements may be mounted on the support wheels at equiangular spacing to produce individual cut strip pieces of uniform length, or at different selected angular spacings to produce cut strip pieces having a range of lengths similar to French fry strips cut from whole potatoes. Drive means are provided for rotatably driving at least one of the support wheels at a rotational speed for displacing the cutting elements into engagement with the extruded strips at a velocity closely matching the conveyor velocity.

Each cutting element, in accordance with the preferred form of the invention, comprises an elongated carrier bow having opposite ends thereof mounted on the pair of rotary support wheels. This carrier bow includes radially outwardly extending struts formed generally at the opposite sides of the conveyor. A cutting wire extends between these struts and is selectively tensioned for engaging and cutting extruded strips on the underlying conveyor. In the preferred form, conveyor may be provided with a centrally crowned cross sectional shape, and the wire tension is adjustably selected so that the cutting wire assumes a substantially mating shape upon engagement with the extruded strips on the conveyor.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented and somewhat schematic side elevation view illustrating a multilane strip extruder system and a related rotary cutter embodying the novel features of the invention;

FIG. 2 is a fragmented and somewhat schematic top plan view of the extruder system and rotary cutter of FIG. 1;

FIG. 3 is an enlarged top plan view of an individual cut strip piece formed by the rotary cutter;

FIG. 4 is a cross sectional view of the cut strip piece taken generally on the line 4—4 of FIG. 3;

DETAILED DESCRIPTION OF THE PREFERRED EMBODIMENT

Figure 5:
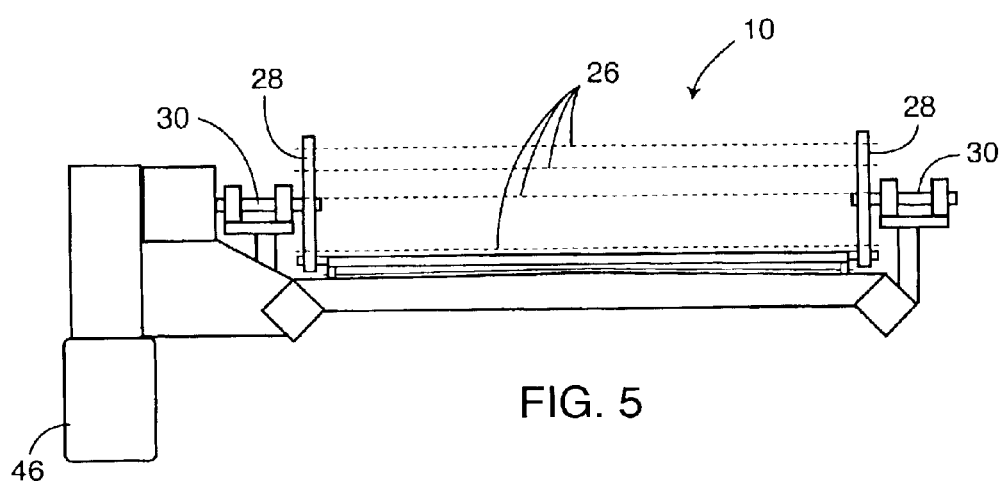
FIG. 5 is an enlarged and somewhat schematic sectional view taken generally on the line 5—5 of FIG. 2.

As shown in the exemplary drawings, an improved rotary cutter referred to generally in FIGS. 1 and 2 by the reference numeral 10 is provided for cutting a plurality of elongated extruded strips 12 (FIG. 2) of a selected food dough product or the like on a conveyor 14. The rotary cutter 10 is designed for cutting the multiple extruded strips 12 into individual strip pieces 16 (FIGS. 2–4) having angularly formed end cuts 18 to simulate the shape of French fry potato strips cut from whole raw potatoes.

FIGS. 1 and 2 generally illustrate the rotary cutter 10 of the present invention installed in overlying relation to the conveyor 14 at a location spaced downstream from an extruder 20. The extruder 20 receives a supply of a food dough product, such as a potato-based or corn-based dough material from a suitable source 22, and includes appropriate extrusion dies (not shown) for subdividing the dough material into the plurality of elongated extruded strips 12 deposited onto the conveyor 14 in relatively closely spaced parallel relation. In this regard, FIG. 2 depicts a total of twenty five closely spaced extruded strips deposited continuously onto the conveyor 14, although it will be recognized and appreciated that a larger selected number of extruded strips 12 can be produced in parallel according to the design and size of the extruder 20 and the associated underlying conveyor 14. In one form, the extruder 20 may be constructed in accordance with Provisional Appln. No. 60/303,628, filed Jul. 5, 2001, which is incorporated by reference herein. The formed dough strips 12 each have a cross sectional size and shape corresponding to the cross sectional size and shape of French fry potato strips cut from whole potatoes, such as a substantially square-cut cross section of about 0.30 inch in the case of so-called shoestring size potato strips (as depicted in FIGS. 3–4). Alternative cross sectional extruded strip shapes may be formed, such as rectangular shapes, or a generally square-cut or rectangular cross sectional geometries including concave side wall surfaces, and other shapes. The extruded strips 12 are carried on the conveyor 14, as indicated in FIG. 2 by arrow 24, in a downstream direction for appropriate cutting of the strips 12 into the individual strips pieces 16 of desired length by means of the rotary cutter 10.

In general terms, the rotary cutter 10 includes a plurality of cutting elements 26 extending transversely and angularly across the conveyor 14 for engaging and cutting the underlying extruded strips 12 with the desired angular end cuts 18. In the preferred geometry, these cutting elements 26 extend across the conveyor 14 at an angle of about 65° to the longitudinal direction of conveyor travel, or about 25° to a line extending transversely of the direction of conveyor travel, to produce the angular end cuts 18 on each strip piece 16, as viewed in FIGS. 2–4. With this geometry, the cut individual strip pieces 16 have an overall appearance which simulates traditional French fry potato strips cut from whole and typically raw potatoes. Importantly, however, the rotary cutter 10 of the present invention is designed to make these end cuts 18 in the extruded strips 12 substantially without imparting sideways or transverse forces to the strips which could otherwise shift the strip pieces laterally on the conveyor 14 and cause them to stick together. Such sticking of the cut strips pieces 16 undesirably results in strip clumps as the dough strip pieces are further processed, such as by parfrying, freezing and packaging.

The rotary cutter 10 includes a pair of rotary support wheels 28 mounted at opposite sides of the conveyor 14. These two support wheels 28 are mounted by suitable bearing means or bearing blocks 30 (FIG. 5) for rotation respectively about individual axes extending substantially transverse or perpendicular to the longitudinal direction of conveyor travel. However, the two support wheels 28 are positioned so that their respective rotational axes are longitudinally spaced or offset from one another.

Figure 7:
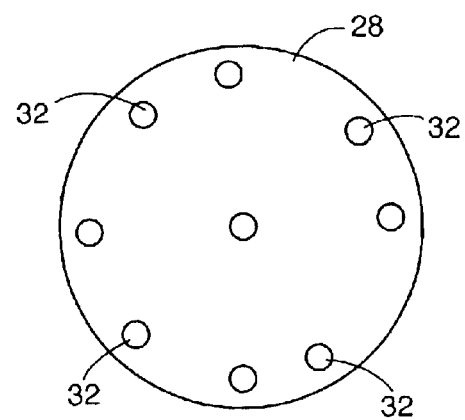
FIG. 7 is an enlarged side elevation view of a support wheel forming a portion of the rotary cutter.

The plurality of cutting elements 26 span between the longitudinally offset rotary support wheels 28, whereby the cutting elements 26 are carried by the support wheels 28 in the desired orientation extending laterally and angularly across the conveyor 14. These cutting elements 26, which may be provided in any selected number, have their opposite ends seated within a pair of open slots 32 formed in the rotary support wheels 28 near the peripheries thereof. As shown, these slots 32 are arranged or indexed on a common radius generally at or adjacent the perimeters of the support wheels 28 so that the plural cutting elements 26 are arranged in a mutually parallel relation. The angular spacing between adjacent cutting elements 26 on the support wheels 28 may be uniform to produce cut strip pieces 16 of uniform lengths, or such spacing may be non-uniform as viewed in FIG. 7 to produce cut strip pieces 16 having a range or distribution of strip lengths closely simulating the lengths of French fry strips cut from natural potatoes. FIG. 7 shows the slots 32 to have a circular shape.

Figure 6:
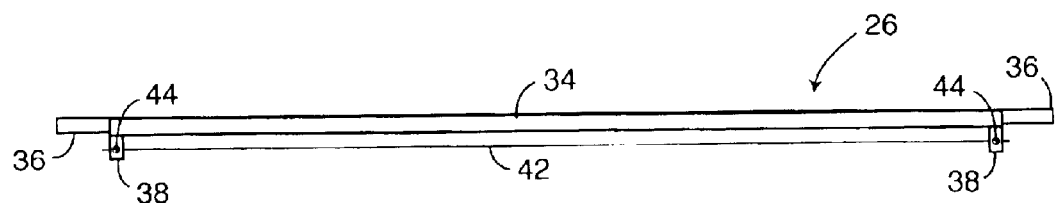
FIG. 6 is an enlarged elevation view showing a cutter element of the rotary cutter.

In one preferred form, each cutting element 26 comprises an elongated and substantially rigid support or carrier bow 34 (shown best in FIG. 6) having axially protruding spindle pins 36 at opposite ends thereof for seated reception into the associated pair of support slots 32 on the wheels 28. These spindle pins 36 may be provided with a circular cross sectional shape as shown for substantially mated and rotational slide-fit reception into the support wheel slots 32. Individual rotary bearings (not shown) may be provided for rotatably supporting the spindle pins 36 of each carrier bow 34 on the two support wheels 28. Near the spindle pins 36, each carrier bow 34 further includes a pair of relatively short struts 38 projecting at a right angle to the carrier bow axis and having small ports formed therein for seated and adjustably locked reception of the opposite ends of an elongated cutting member such as a wire 42. An adjustment screw 44 is provided at one or both of these struts 38 at one or both ends of the cutting wire 42 for adjusting the wire tension in a manner to achieve substantially optimized cutting of the extruded strips 12 on the underlying conveyor 14. With this construction, the carrier bows 34 of the cutting elements 26 are mounted for rotation with the support wheels 28, with their respective cutting wires 42 at the outboard or free ends of the struts 38.

A drive motor 46 is provided for rotatably driving at least one of the rotary support wheels 28, in a counter-clockwise direction as viewed in FIG. 1. As the support wheels 28 are rotated, each carrier bow 34 is rotatably supported on the support wheels so that their respective struts 38 and the cutting wires 42 mounted thereon are suspended or hang downwardly for displacing the cutting wires 42 in sequence into cutting engagement with the extruded strips 12 on the underlying conveyor 14. The support wheel drive speed is closely monitored and adjusted to substantially match the speed of conveyor travel so that each cutting wire 42 moves into engagement with and cuts the underlying closely spaced parallel extruded strips 12 with a longitudinal velocity that closely matches the longitudinal velocity of the strips 12 on the conveyor. With this speed regulation, in combination with the rotation of the support wheels 28 on axes normal to the conveyor travel direction, the portions of cutting wires 42 which engage the strips 12 substantially match the strip motion in terms of both speed and direction. Importantly, the cutting wires 42 have no component of velocity extending in a sideways or transverse direction, whereby the cutting wires 42 do not kick or shift the strips 12 laterally on the conveyor during the cutting process.

Appropriate tensioning of the cutting wires 42 in relation to the cross sectional configuration of the conveyor 14 provides further improvements to the cutting process. More particularly, a preferred conveyor geometry is somewhat crowned or raised in the middle with downwardly and outwardly sloping sides. The specific conveyor geometry comprises a catenary curve shaped for mating conformance with the tensioned cutting wires 42 as they move into cutting engagement with all of the extruded strips 12 across the width of the conveyor. That is, as each cutting wire 42 rotates downwardly into cutting engagement with the extruded strips 12, reaction forces load the wire along its length. The cutting wire 42 is suitably pre-tensioned so that it will assume a catenary curve conforming to the crowned cross sectional shape of the conveyor as the cutting wire bottoms out across the conveyor width.

The improved rotary cutter 10 of the present invention thus provides a relatively simple apparatus for quickly cutting a large plurality of extruded food dough strips 12 or the like placed in closely spaced parallel relation on a conveyor 14, for production quantity cutting into individual strip pieces 16 of selected length or lengths with angular end cuts.

A variety of modifications and improvements in and to the rotary cutter 10 of the present invention will be apparent to those persons skilled in the art. For example, in one alternative preferred form, each cutting element 26 may be modified to include a main rigid support bar having the spindle pins 36 at opposite ends thereof for rotatable mounting on the pair of support wheels 28, wherein this support bar includes means for removably mounting a modified carrier bow which omits the spindle pins but otherwise includes the struts 38 for supporting the associated cutting wire 42 under adjustably selected tension. In this modified design, a carrier bow with cutting wire mounted thereon can be quickly and easily replaced, for example, in the event of wire breakage. Accordingly, no limitation on the invention is intended by way of the foregoing description and accompanying drawings, except as set forth in the appended claims.

What is claimed is:

1. A rotary cutter for cutting a plurality of elongated dough strips supported and conveyed on a conveyor in relatively closed spaced parallel relation, said rotary cutter comprising:
   a pair of rotary support wheels mounted at opposite sides of the conveyor for respective rotation on longitudinally spaced axes each extending generally normal to the direction of conveyor travel;
   a plurality of elongated cutting elements mounted in generally parallel relation with their opposite ends supported respectively generally at the peripheries of said support wheels and extending therebetween generally transversely and angularly relative to the direction of conveyor travel; and
   drive means for rotatably driving said rotary support wheels for rotating said cutting elements into cutting relation with the elongated dough strips to cut the dough strips into a plurality of individual cut pieces each having angularly cut ends.

2. The rotary cutter of claim 1 wherein each of said cutting elements comprises a cutting wire.

3. The rotary cutter of claim 1 wherein said cutting elements each have their opposite ends supported generally on a common radius disposed generally at the peripheries of said support wheels.

4. The rotary cutter of claim 3 wherein said cutting elements are supported by said support wheels in a generally equiangular spaced relation.

5. The rotary cutter of claim 3 wherein said cutting elements are supported by said support wheels in a generally nonuniform angular spaced array.

6. The rotary cutter of claim 1 wherein said cutting elements extend generally transversely and angularly at an angle of about 65° relative to the direction of conveyor travel.

7. The rotary cutter of claim 1 wherein each of said cutting elements comprises a relatively rigid carrier bow extending between said pair of support wheels, and further comprising a flexible cutting wire carried by said carrier bow.

8. The rotary cutter of claim 7 wherein each of said cutting elements further comprises means for adjustably tensioning said flexible cutting wire.

9. The rotary cutter of claim 1 wherein said drive means rotatably drives said support wheels for displacing said cutting elements into cutting engagement with the elongated dough strips at a speed generally matching the speed of conveyor travel.

10. A rotary cutter system for cutting a plurality of elongated dough strips into individual strip pieces each having angularly cut ends, said rotary cutter system comprising:

a conveyor for supporting and conveying the plurality of elongated dough strips in relatively closed spaced parallel relation;

a pair of rotary support wheels mounted at opposite sides of the conveyor for respective rotation on longitudinally spaced axes each extending generally normal to the direction of conveyor travel;

a plurality of elongated cutting elements mounted in generally parallel relation with their opposite ends supported respectively generally at the peripheries of said support wheels and extending therebetween generally transversely and angularly relative to the direction of conveyor travel; and drive means for rotatably driving said rotary support wheels for rotating said cutting elements into cutting relation with the elongated dough strips to cut the dough strips into a plurality of individual cut pieces each having angularly cut ends.

11. The rotary cutter system of claim 10 further including extrusion means for extruding and depositing the elongated dough strips onto said conveyor in relatively closely spaced parallel relation.

12. The rotary cutter system of claim 10 wherein said cutting elements extend generally transversely and angularly at an angle of about 65° relative to the direction of conveyor travel.

13. The rotary cutter system of claim 10 wherein said cutting elements each have their opposite ends supported generally on a common radius disposed generally at the peripheries of said support wheels.

14. The rotary cutter system of claim 13 wherein said cutting elements are supported by said support wheels in a generally equiangular spaced relation.

15. The rotary cutter system of claim 13 wherein said cutting elements are supported by said support wheels in a generally nonuniform angular spaced array.

16. The rotary cutter system of claim 10 wherein each of said cutting elements comprises a relatively rigid carrier bow extending between said pair of support wheels, and further comprising a flexible cutting wire carried by said carrier bow.

17. The rotary cutter system of claim 16 wherein each of said cutting elements further comprises means for adjustably tensioning said flexible cutting wire.

18. The rotary cutter system of claim 10 wherein said drive means rotatably drives said support wheels for displacing said cutting elements into cutting engagement with the elongated dough strips at a speed generally matching the speed of conveyor travel.

19. A rotary cutter for cutting a plurality of elongated dough strips supported and conveyed on a conveyor in relatively closed spaced parallel relation, said rotary cutter comprising:

a pair of rotary support wheels mounted at opposite sides of the conveyor for rotation on axes extending generally normal to the direction of conveyor travel;

a plurality of elongated cutter supports having their opposite ends supported respectively generally at the peripheries of said support wheels and extending generally in parallel therebetween, each of said cutter supports including at least one cutting member extending generally transversely and angularly relative to the direction of conveyor travel; and drive means for rotatably driving said rotary support wheels for rotating said cutting members into cutting relation with the elongated dough strips to cut the dough strips into a plurality of individual cut pieces each having angularly cut ends.

20. The rotary cutter of claim 19 wherein said pair of rotary support wheels are supported for rotation on longitudinally spaced axes.

21. The rotary cutter of claim 19 wherein said at least one cutting member extends generally transversely and angularly at an angle of about 65° relative to the direction of conveyor travel.

* * * * *